United States Patent [19]

Higgins

[11] Patent Number: 4,662,095
[45] Date of Patent: May 5, 1987

[54] ROOF MOUNTED FOLDABLE SIGN

[76] Inventor: John R. Higgins, 2352 Main St., Concord, Mass. 01742

[21] Appl. No.: 752,557

[22] Filed: Jul. 8, 1985

[51] Int. Cl.[4] .............................................. G09F 13/16
[52] U.S. Cl. ........................................ 40/592; 40/610
[58] Field of Search ................ 40/592, 601, 610, 492; 340/68, 107, 127, 135, 138; 108/6; 296/86

[56] References Cited

U.S. PATENT DOCUMENTS

| | | | |
|---|---|---|---|
| 1,082,997 | 12/1913 | Braasch | 108/6 |
| 2,164,985 | 7/1939 | Cardarelli | 40/610 |
| 2,836,914 | 6/1958 | Nelson et al. | 40/592 |
| 2,888,763 | 6/1959 | Roycroft, Jr. | 40/492 |
| 3,298,122 | 1/1967 | Hansen | 40/592 |
| 3,318,031 | 5/1967 | Whalky et al. | 40/592 |
| 3,761,890 | 9/1973 | Fritts et al. | 40/592 |
| 4,026,595 | 5/1977 | Jacks | 40/592 |
| 4,087,124 | 5/1978 | Wiley, Jr. | 40/592 |
| 4,152,854 | 5/1979 | Berry, Jr. et al. | 40/592 |
| 4,259,660 | 3/1981 | Oliver | 40/592 |

FOREIGN PATENT DOCUMENTS

| | | | |
|---|---|---|---|
| 998416 | 10/1976 | Canada | 108/6 |
| 2249497 | 4/1974 | Fed. Rep. of Germany | 40/592 |
| 2651468 | 5/1978 | Fed. Rep. of Germany | 40/592 |

*Primary Examiner*—Gene Mancene
*Assistant Examiner*—Cary E. Stone
*Attorney, Agent, or Firm*—Irving M. Kriegsman

[57] ABSTRACT

A foldable sign capable of being mounted on the roof of a vehicle. The foldable sign has a sign plate pivotally mounted upon a base which may be removably or fixedly secured to the roof of the vehicle. Interconnected between the sign plate and the base is a latching mechanism capable of securely locking the sign plate at two portions thereof in either an upright (unfolded) position or a horizontal (folded) position with respect to the base. The latching mechanism includes a movable rod which enables an individual with a single sliding movement of the rod to simultaneously disengage the latching mechanism from both portions of the sign plate. In so doing, it is possible to maintain a positive locking of the sign plate in either the upright or retracted positions while enabling a quick release of the locking action to be effected when desired.

19 Claims, 5 Drawing Figures

ROOF MOUNTED FOLDABLE SIGN

BACKGROUND OF THE INVENTION

This invention relates generally to signs which are mounted on the roof of a vehicle such as an automobile or van, and, more particularly, to a sign such as a school bus sign which can be mounted on the roof of a vehicle and then unfolded into a vertical position when it is to be in use or folded into a horizontal position when it is not to be in use by a latching mechanism connected to each end of the sign yet capable of being operated from one end thereof.

With the constantly increased demand for transportation, especially in the area of conveying children to and from schools or day care centers, there has been a dramatic increase in the need for vehicles capable of effecting this transportation. Unfortunately, providing specifically constructed marked buses and vans which can be used solely for the transportation of passengers becomes an expensive undertaking. In many instances the expense per passenger per mile is far too great to justify the cost of maintaining such vehicles. It has therefore become common practice to utilize passenger vehicles such as station wagons and vans as acceptable and efficient alternate forms of transportation, especially when specifically manufactured buses and vans are unavailable or not practical to use.

In the case where passenger vehicles are utilized as school buses, for example, it is a state and federal requirement that such vehicles be appropriately marked as such and also contain appropriate warning lights. In order to meet these requirements auxiliary signs have been manufactured which contain a suitable space thereon for the appropriate markings (such as a SCHOOL BUS designation) as well as having mounted thereon warning lights. These signs are generally affixed to the roof of the vehicle. In some instances the signs are permanently secured to the roof of the vehicle by bolts or the like; however, in the preferred arrangement, the sign is removably mounted on the roof such as means of gutter clamps in a similar manner to the securing of ski racks.

Quite often, these signs are mounted on the roof by a mechanism which allows the sign to be pivoted or folded so that it can be positioned in either a vertical (upright) position or a horizontal position. When the vehicle is being used for the purpose indicated by the sign, the sign is placed in the vertical position. On the other hand, when the vehicle is not being used for the purpose indicated by the sign or when going through car washes and the like the sign is placed in a horizontal position.

One of the problems encountered with foldable signs currently available is a result of the latching system used to lock the sign in the vertical and horizontal position. To date, these latching systems have consisted of a pair of latching mechanisms (such as barrel bolts or spring clips) attached at opposite ends of the sign in order to fixedly support the sign in the desired position. To operate such prior art latching systems, the driver of the vehicle must affix or release each one of the two latching mechanisms in order to effect the appropriate folding or opening action associated with the sign. This involves walking around to the passenger side of the vehicle to release the latch mechanism of that side thereof since the latch mechanism on the passenger side cannot be reached by the driver while standing on the driver's side. In order to avoid the necessity of the walking around to the passenger side of the vehicle to activate the latch mechanism on that side thereof, there has been a tendency for the driver/operator to secure the sign in the desired position by activating, i.e. using only the latch mechanism on the driver side of the vehicle and not using the latch mechanism on the passenger side. In some instances the use of the latching mechanism on one side of the sign as offered to the latching mechanism on both sides of the sign may prove effective; however, in most situations using only one latching mechanism creates a condition which not only places tremendous strain on the sign, but also may lead to a dangerous condition if the single latching mechanism becomes insufficient to hold the sign securely in place.

A typical problem arises when the vehicle is driven at highway speeds and the resultant force created by the flowing air or wind causes the sign to bend or strain. Under that condition the single latching mechanism acts as a pivot point for the sign. Since the signs are generally made of a light weight material such as aluminum it is readily apparent that in a short time the sign will become practically useless. In fact, there have been situations where the sign has been completely sheared off the roof of the vehicle as a result of only latching the sign at one end thereof. Furthermore, prior foldable signs fail to provide any locking in the retracted position.

It is therefore abundantly clear that a great need exists for a foldable sign which is capable of being easily moved and secured in either an upright position or a horizontal position. This movement of the sign between the two positions would require only a minimum of effort on the part of the operator of the vehicle, yet once positioned in either the upright position or lowered position, the sign must remain in the desired position even when the vehicle is subjected to adverse environmental conditions, such as high winds.

SUMMARY OF THE INVENTION

The present invention overcomes the problems encountered in the past and as set forth in detail hereinabove by providing a foldable sign which is capable of being effectively mounted on the roof of a vehicle, and once mounted thereon can be readily moved from a locked, upright position to a locked, folded down position by means of a single latch mechanism which simultaneously engages both ends of the sign. Although the foldable sign of this invention is primarily utilized in conjunction with passenger vehicles such as station wagons and vans involved with the commercial transportation of passengers such as school children, it should be recognized thet the foldable sign of the present invention can also find utility with numerous other types of vehicles and for a wide range of other purposes.

The present invention is in the form of a foldable sign made up of a substantially rectangular-shaped sign plate pivotally secured to a base which incorporates therein a pair of L-shaped feet and which is adpated to be attached to the roof of a vehicle such as an automobile or van. Interconnected between the sign plate and the base is a single latching mechanism capable of simultaneously locking both ends of the sign plate with respect to the base whether the sign plate is in the upright position (i.e. substantially perpendicular to the roof of the vehicle) or in a down or retracted position (i.e. substantially parallel to the roof of the vehicle).

The single latching mechanism of the foldable sign of the present invention is made up of an elongated rod which protrudes through the feet of the base and has a pair of clamps secured at opposite ends thereof. Each of the clamps contain a U-shaped channel therein for matingly engaging a pair of extensions, respectively, jointed on opposite ends of the sign plate when the signs is in the upright position. In addition, the clamps are so designed to have the upper surfaces thereof engage the extensions of the sign plate in order to securely hold the sign plate in the collapsed or retracted position when the sign is folded. A spring is operably connected between the rod and one of the feet of the base in order to provide sufficient force to enable the operator of the vehicle to operate the latching mechanism at only one end thereof and yet provide two ended locking of the sign plate whether in the upright or lowered position.

In addition, the foldable sign of this invention includes a pair of warning lights, each of the lights being mounted on opposite ends of the sign plate. The warning lights can be appropriately connected to any suitable power source within the vehicle or may contain their own power supply if so desired. Conventional flashers may be associated with the warning lights so as to provide sufficient indication that the vehicle has reached a stop and is either loading or discharging passengers.

Substantially permanent attachment of the base of the sign to the vehicle roof may be accomplished by means of bolts which can be passed through appropriately spaced holes in the feet of the sign and through holes drilled in the roof of the vehicle. Alternatively, the foldable sign of this invention may be removably attached to the roof of the vehicle by means of gutter clamps attached by means of elongated threaded rods which pass through openings strategically placed in feet of the base.

By means of the single latching mechanism, the foldable sign of the present invention can be securely locked in the upright position with clamps rigidly supporting the sign plate at both ends thereof. If it is desired to lower the sign plate of the foldable sign of this invention, one must merely pull on a handle or knob located at one end of the elongated rod. This action simultaneously frees the clamps from both ends of the sign plate and allows the sign plate to fold to the lowered or inoperative position. Once the handle is released, the two clamps simultaneously engage the ends of the sign plate and securely lock the sign plate in the down position.

It is therefore an object of this invention to provide a foldable sign for use on the roof of a vehicle.

It is another object of this invention to provide a foldable sign which incorporates therein a single latching mechanism capable of simultaneously securing opposite ends of the sign in either an upright, or a folded position.

It is still another object of this invention to provide a foldable sign which has a latching mechanism which is adapted to lock opposite ends of the sign and which is capable of being activated from only one end thereof by the appropriate movement of a single handle or knob.

It is a further object of this invention to provide a foldable sign which incorporates therein a single latching mechanism capable of engaging opposite ends of the sign in order to effect an extremely secure locking arrangement.

It is even a further object of this invention to provide a foldable sign which is capable of being removably affixed to the roof of a vehicle.

It is still a further object of this invention to provide a foldable sign which is economical to produce and which is made up of components that are readily mass produced.

For a better understanding of the present invention, together with other and further objects thereof, reference is made to the following description, taken in conjunction with the accompanying drawings, and its scope will be pointed out in the appended claims.

DETAILED DESCRIPTION OF THE PREFERRED EMBODIMENT

Figure 1:
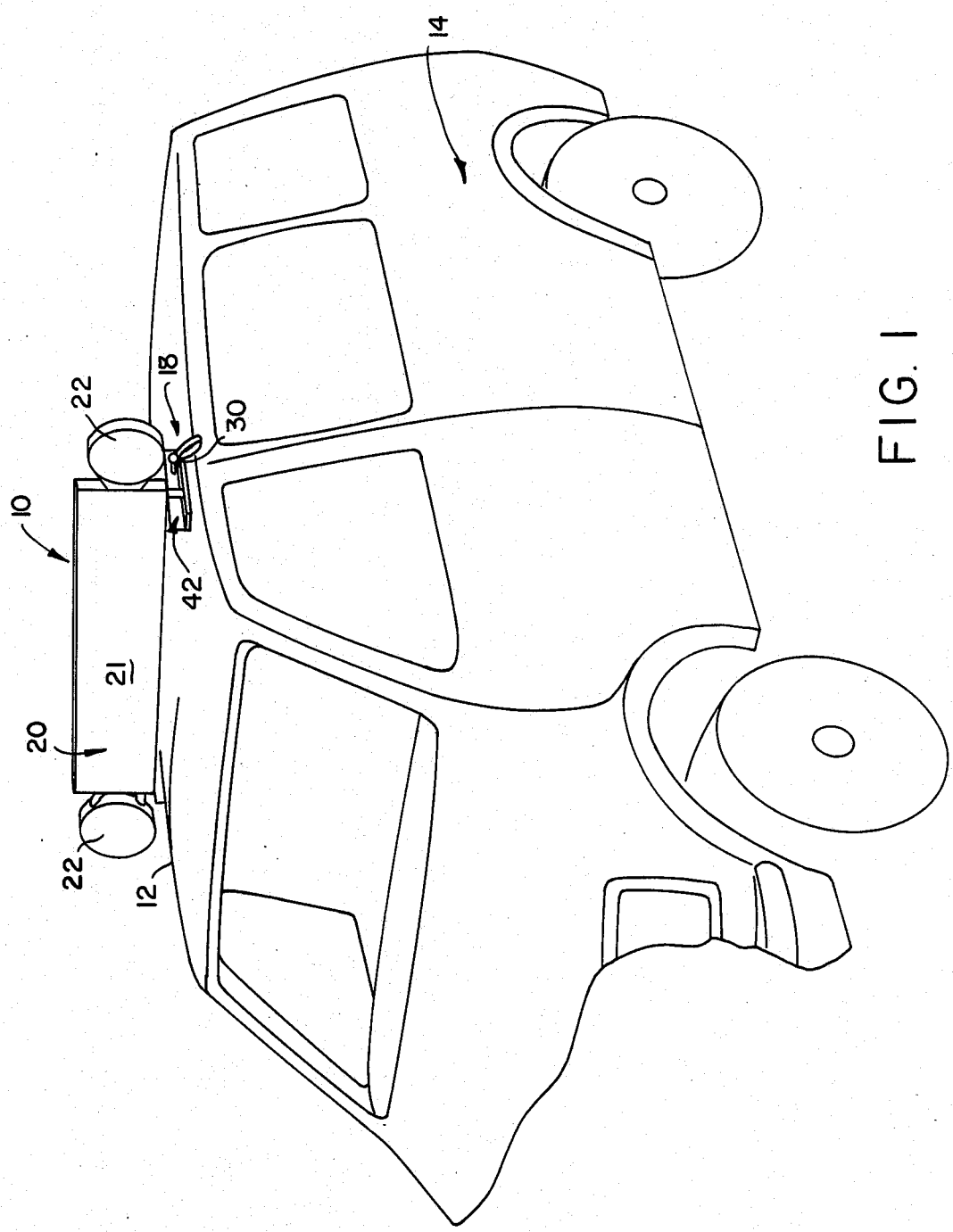
FIG. 1 is a pictorial representation taken from the front of the foldable sign of this invention mounted on the roof of a vehicle.
Figure 3:
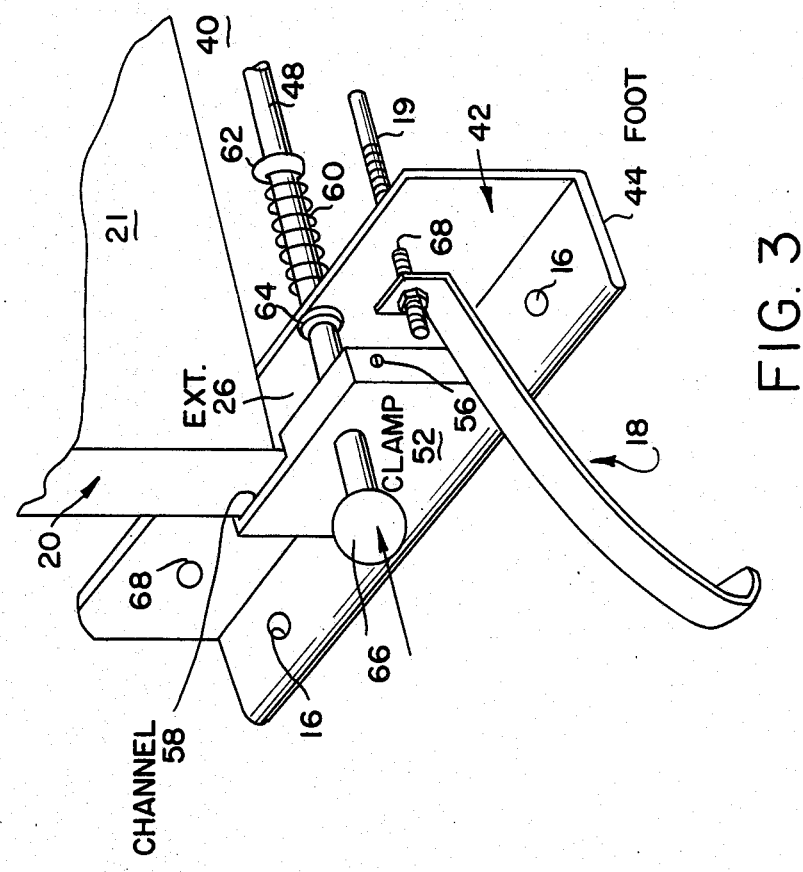
FIG. 3 is a partial pictorial representation of the foldable sign of this invention shown in its upright, operation position.

Reference is now made to FIG. 1 of the drawings which pictorially illustrates the foldable sign 10 of the present invention on the roof 12 of a vehicle 14 such as an automobile or van. Such a foldable sign 10 finds its greatest utility when used in conjunction with a passenger vehicle 14 which is used part-time in the transportation of school children. With the use of sign 10 of this invention an ordinary vehicle 14 can be quickly converted into a school bus and just as quickly be reconverted for private use. In operation, sign 10 is either fixedly secured to roof 12 by bolts passing through holes 16 shown more clearly in FIGS. 3–5 of the drawings, or removably secured to roof 12 by gutter clamps 18 as shown in FIGS. 1 and 3 of the drawings and explained in greater detail hereinbelow.

Figure 2:
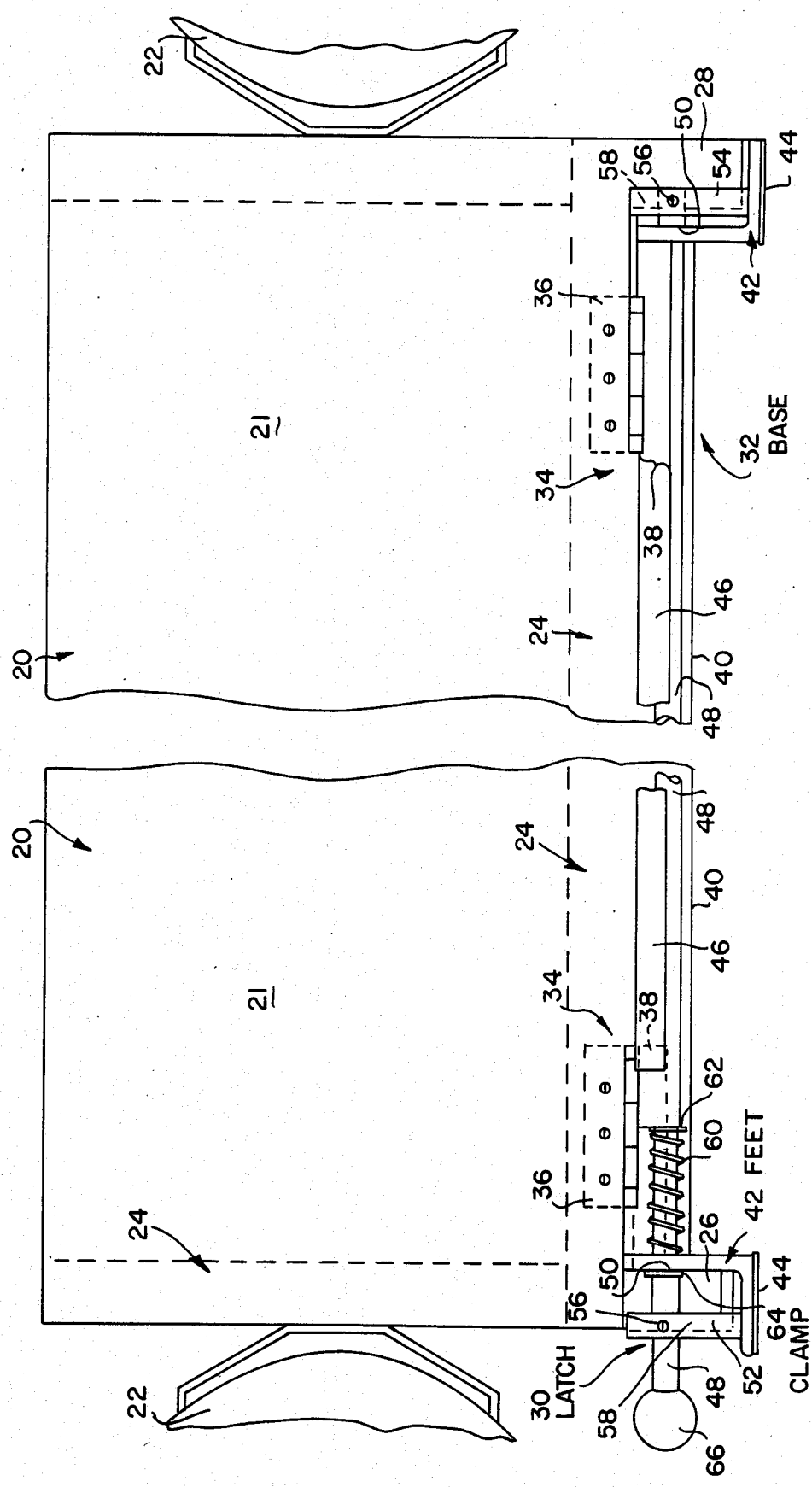
FIG. 2 is a back view, shown partly in sgemented fashion, of the foldable sign of this invention as shown in FIG. 1.

As shown more clearly in FIGS. 1 and 2, folded sign 10 is made up of a sign plate 20 approximately 3.5 feet in length and 8.25 inches in height whereon specific decals or indicia may be placed representative of the type of use for vehicle 14 such as SCHOOL BUS. In accordance with applicable state and federal law, a pair of double-faced warning lights 22 are mounted on opposite ends of sign plate 20. Lights 22 may be powered by an independent power source such as the electrical system (battery) of vehicle 14 or a self-contained battery (not shown). Any conventional flasher may be associated with warning lights 22 if desired.

More specifically, sign plate 20 is made of a thin inverted U-shaped covering 21 formed over a frame 24 which includes a pair of extensions 26 and 28. Extensions 26 and 28 are used in conjunction with latching mechanism 30 as set forth in greater detail hereinbelow. Frame 24 is of a U-shaped configuration and is pivotally secured to a base 32 by means of any suitable hinges 34.

Figure 4:
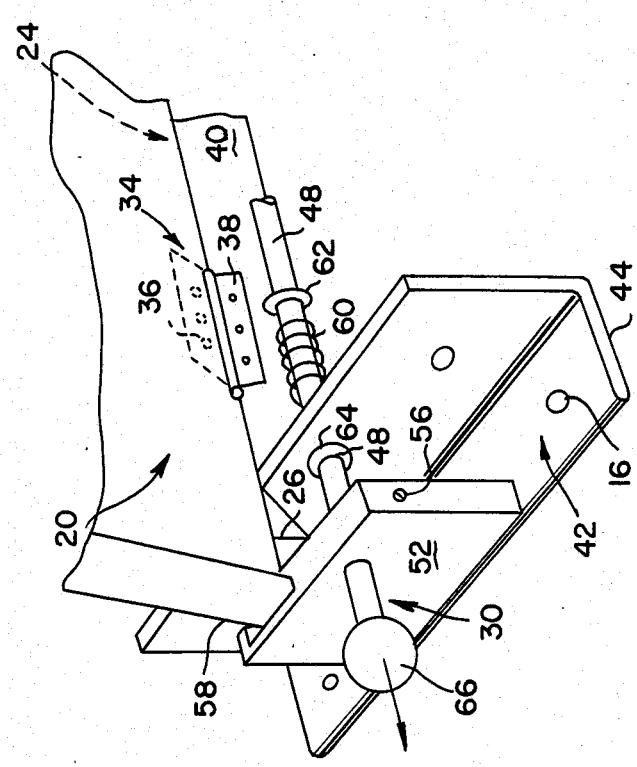
FIG. 4 is a partial pictorial representation of the foldable sign of this invention shown in an intermediate position.

As clearly shown in FIGS. 2 and 4 of the drawings, hinges 34 are affixed at one portion 36 thereof to frame 24 and at the other portion 38 thereof to a support bar 40 of base 32. Referring once again to FIG. 2 of the drawings, base 32 is constructed of a pair of spaced apart L-shaped feet 42 having cushion elements 44 on the bottom thereof, preferably made of rubber in order to prevent the marring of roof 12 of vehicle 14. As stated above, support bar 40 is affixed between feet 42 by any suitable securing method such as welding in order to provide for a rigid base 32. Additional support is provided for base 32 by a support rod 46 also affixed between feet 42 as illustrated in FIG. 2 of the drawings. In order to provide for as lightweight construction as possible of foldable sign 10, all major components thereof are preferably made of aluminum.

Reference is now made to FIGS. 2-5 wherein a single latching mechanism 30 is clearly illustrated. Latching mechanism 40 is made up of an elongated rod 48 which slidably protrudes through an opening 50 in each of feet 42. Attached adjacent each end of rod 48 is a clamp 52 and 54. Set screws 56 are used to adjustably secure clamps 52 and 54 on rod 48 so as to maintain the proper relationship between claimps 52, 54 and extensions 26,28 of the frame 24 of sign plate 20.

Figure 5:
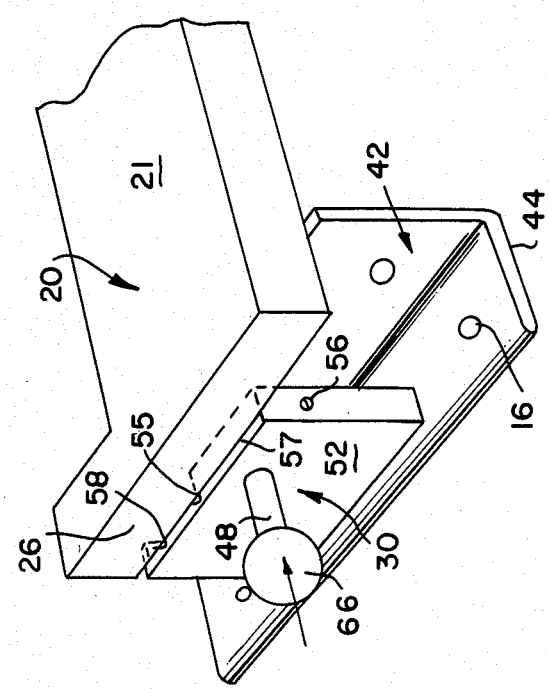
FIG. 5 is a partial pictorial representation of the foldable sign of this invention shown in its collapsed, folded position.

As clearly shown in FIGS. 3-5, clamps 52 and 54 are each formed so as to contain a channel 58 therein of a configuration such that it is capable of matingly engaging a respective one of the extensions 26,28 of frame 24 when sign plate 20 is in its upright or operable condition. This condition is pictorially illustrated in FIG. 3 of the drawings. In addition, clamps 52 and 54 must be of such a preselected height so that the inner surface 55 of extensions 26 and 28, respectively, engage the top surface 57 of clamps 52 and 54 when the sign plate 20 is in its retracted or inoperative position as shown in FIG. 5 of the drawings. This specific configuration of clamps 52 and 54 enables opposite ends of sign plate 20 to be locked in both the upright and retracted positions.

Continuing with the description of single latching mechanism 30, rod 48 has positioned thereon near one end thereof a coil spring 60. Spring 60 is held in position between one of the L-shaped feet 42 and a retaining element 62 affixed to rod 48 by any suitable securing means such as spot welding. A second retaining element 64 is affixed to rod 48 on the other side of L-shaped foot 42 in order to limit the movement of rod 48 with respect to feet 42. In addition, a knob or handle 66 is affixed to the end of rod 48 nearest spring 60 to aid an operator in moving latching mechanism 30 (rod 48) against the action of spring 60.

Stated more succinctly, spring 60 tends to bias clamps 52 and 54 into engagement with extensions 26 and 28 while the force of an operator on knob or handle 55 acts to move clamps 52 and 54 out of engagement with extensions 26 and 28. It is therefore evident that clamp 52 is positioned on rod 48 so as to have channel 58 mate with the outside surface of extension 26 while clamp 54 is positioned on rod 48 so as to have its channel 58 mate with the inside surface of extension 28.

Referring to FIG. 3 in particular, holes 16 are depicted in the bottom surface of L-shaped feet 42 in order for bolts (not shown) to pass therethrough for fixedly securing the base 32 to roof 12. If it is desired to removably mount foldable sign 10 to roof 12, a pair of gutter clamps 18 are provided in conjunction with elongated threaded rods 19 for each foot 42. For simplicity, only one gutter clamp 18 is shown in FIGS. 1 and 3. The threaded rods 19 pass through appropriately spaced holes 68 in feet 42. If desired, a single Y-shaped gutter clamp (not shown) may be provided to mount through holes 68 in each foot 42.

MODE OF OPERATION

Once sign 10 is mounted on roof 12 of an appropriate vehicle 14 by either permanently affixing the sign 10 thereto or removably affixing the sign 10 thereto, it becomes relatively simple to move the foldable sign 10 of this invention between an upright position as shown in FIGS. 1-3 and the retracted position shown in FIG. 5 of the drawings. Assuming the sign is initially locked in the upright position illustrated in FIG. 3 and the operator of the vehicle wishes to lower or retract the sign to its inoperable position, the operator need only perform the following steps:

(1) Pull on knob or handle 66 in the direction of the arrow as shown in FIG. 4 while simultaneously pivoting sign plate 20 downward to the position shown in FIG. 5; and (2) Allow the action of spring 60 to retract rod 48 to its initial position after sign plate 20 is in its fully retracted position as shown in FIG. 5.

The above steps enable the clamps 52 and 54 to engage the undersurface of extensions 26 and 28, respectively, thereby securely locking sign plate 20 at both ends in the retracted position. To lift sign plate 20 to the upright position the above steps 1 and 2 need merely be reversed with sign plate 20 having the extensions 26 and 28 matingly engage channels 58 when in the fully upright position (see FIG. 3). It is essential to note that both ends of the sign plate 20 are locked in position with the action of single latching mechanism 30. There is no need to perform two separate latching or locking procedures. The double locking takes place with a single latching/unlatching operation. It is also important to realize that locking of sign plate 20 takes place both in the upright and retracted positions, a substantial improvement over past foldable signs.

It is also to be noted that although it is desirable to perform the latching and unlatching procedure by pulling knob or handle 66, it is possible to accomplish the same end by pushing on clamp 54 if the operator is on the other side of vehicle 14. Consequently, it is abundantly clear that only a single movement of rod 48 creates a locking (or unlocking as the case may be) of both sides of sign plate 20 no matter which side of the vehicle the operator is situated.

Although this invention has been described with reference to a particular embodiment, it will be understood that this invention is also capable of further and other embodiments within the spirit and scope of the appended claims.

I claim:

1. A foldable sign adapted to be mounted on the roof of a vehicle, said foldable sign comprising:
   a base, said base being configured to mount on said roof of said vehicle;
   pivotable surface providing means pivotally connected to said base for movement between a first upright position and a second retracted position with respect to said base and for providing a surface on which indicia may be attached thereto; and
   latching means operably interconnected between said base and said pivotable surface providing means for releasably latching said pivotable surface providing means to said base in said first position or in said second position and wherein release of said latching of said pivotable surface providing means with respect to said base is effected by a single movement of said latching means, said latching means being operably interconnected to said pivotable surface providing means at two portions thereof in order to effect a secure latching of said pivotable surface providing means to said base in said first position or in said second position, said two portions of said pivotable surface providing means being located at opposite ends thereof, said latching means comprising an elongated rod slidably mounted with respect to said base, means attached to said rod for selectively engaging said pivotable surface providing means, and further comprising means for normal biasing said rod to a position in which said engaging means engages said pivotable surface providing means.

2. A foldable sign adapted to be mounted on the roof of a vehicle, said foldable sign comprising:
  a base, said base being configured to mount on said roof of said vehicle;
  pivotable surface providing means pivotally connected to said base for movement between a first upright position and a second retracted position with respect to said base and for providing a surface on which indicia may be attached thereto; and
  latching means operably interconnected between said base and said pivotable surface providing means for releasably latching said pivotable surface providing means to said base in said first position or in said second position and wherein release of said latching of said pivotable surface providing means with respect to said base is effected by a single movement of said latching means,
  said pivotable surface providing means comprising a frame and a cover encasing said frame, and wherein said frame has a pair of extensions protruding therefrom, said latching means being operably interconnected to said extensions when said pivotable surface providing means is in said first position or in said second position,
  said latching means comprising an elongated rod slidably mounted with respect to said base, means attached to said rod for selectively engaging said extensions and
  means for normally biasing said rod to a position in which said engaging means engages said extensions.

3. A foldable sign as defined in claim 2 wherein said engaging means comprises a pair of clamps.

4. A foldable sign as defined in claim 3 wherein each of said clamps is constructed of a substantially rectangular shaped block of solid material having a channel disposed therein and a substantially flat top surface, and wherein each of said extensions mate within said channel of each of said clamps, respectively, when said pivotable surface providing means is in said first position, and wherein each of said extensions mate with said top surface of each of said clamps, respectively, in said second position.

5. A foldable sign as defined in claim 4 wherein said rod has a knob secured to one end thereof to aid in the movement of said rod during releases of said latching of said pivotable surface providing means to said base.

6. A foldable sign adapted to be mounted on the roof of a vehicle, said foldable sign comprising:
  a base, said base being configured to mount on said roof of said vehicle;
  pivotable means pivotally connected to said base for movement between a first upright position and a second retracted position with respect to said base and for providing a surface on which indicia may be attached thereto; and
  latching means operably interconnected between said base and said pivotable surface providing means for releasably latching said pivotable surface providing means to said base in said first position or in said second position and wherein release of said latching of said pivotable surface providing means with respect to said base is effected by a single movement of said latching means,
  said base comprising a support bar and a pair of spaced apart feet, each of said feet being secured at opposite ends of said support bar, and wherein said pivotable surface providing means is pivotably hinged to said support bar,
  said latching means comprising an elongated rod mounted for slidable movement with respect to said pair of feet, means attached to said rod at each end thereof for selectively engaging said pivotable surface providing means and
  means for normally biasing said rod to a position in which said engaging means engages said pivotable surface providing means.

7. A foldable sign as defined in claim 6 wherein said pivotable surface providing means comprises a frame and a cover encasing said frame, and wherein said frame has a pair of extensions protruding therefrom, said engaging means being operably interconnected with said extensions when said pivotable surface providing means is in said first or in said second position.

8. A foldable frame as defined in claim 7 wherein said engaging means comprises a pair of clamps, each of said clamps being constructed of a substantially rectangular-shaped block of solid material having a channel disposed therein and a substantially flat top surface, and wherein each of said extensions mate within each of said channels of each of said clamps, respectively, when said pivotable surface providing means is in said first position, and wherein each of said extensions mate with said top surface of each of said clamps respectively, in said second position.

9. A foldable sign as defined in claim 8 wherein said latching means further comprises a first retaining element fixedly mounted on said rod abutting said biasing means and located intermediate said pair of feet, and a second retaining element fixedly mounted on said rod adjacent an external surface of one of said feet.

10. A foldable sign as defined in claim 9 wherein said biasing means comprises a spring mounted on said rod and interposed between said one of said feet and said first retaining element.

11. A foldable sign as defined in claim 10 further comprising means removably attached to said base for securing said foldable sign to said roof of said vehicle.

12. A foldable sign as defined in claim 11 wherein said attaching means comprises a gutter clamp at each end of said base and a threaded rod at each end of said base for securing each gutter clamp to one of said feet.

13. A foldable sign as defined in claim 12 wherein said pivotable surface providing means has at least one warning light secured thereto.

14. A foldable sign adapted to be mounted on the roof of a vehicle, said foldable sign comprising:

a base, said base being configured to mount on said roof of said vehicle;

a sign plate mounted on said base for pivotal movement about a bottom edge along a first axis between a first upright position and a second retracted position with respect to said base and for providing a surface on which indicia may be attached thereto; and spring biased latching means mounted on said base and selectively engageable with said sign plate at opposite ends of said sign plate for releasably latching said sign plate to said base in said first position or in said second position and wherein release of said latching of said sign plate with respect to said base is effected by a single movement of said spring biased latching means, said spring biased latching means comprising a rod slidably mounted on said base, a spring for urging said rod in one direction and a pair of clamps fixedly mounted on said rod.

15. A foldable sign as defined in claim 14 wherein said sign plate comprises a frame and a cover encasing said frame, and wherein said frame has a pair of extensions protruding therefrom, said latching means being operably interconnected to said extensions when said sign plate is in said first position or in said second position.

16. A foldable sign as defined in claim 15 wherein each of said clamps is constructed of a substantially rectangular-shaped block of solid material having a channel disposed therein and a substantially flat top surface, and wherein each of said extensions mate within said channel of each of said clamps, respectively, when said sign plate is in said first position, and wherein each of said extensions mate with said top surface of each of said clamps, respectively, in said second position.

17. A foldable sign as defined in claim 16 wherein said rod has a knob secured to one end thereof to aid in the movement of said rod during releases of said latching of said sign plate to said base.

18. A foldable sign as defined in claim 17 wherein said base comprises a support bar and a pair of spaced apart feet, each of said feet being secured at opposite ends of said support bar, and wherein said sign plate is pivotally hinged to said support bar.

19. A foldable sign as defined in claim 18 wherein said elongated rod is mounted for slidable movement along a second axis spaced from said first axis.

* * * * *